Aug. 11, 1959  H. C. HOWSAM  2,899,147
REEL STRUCTURE
Filed May 31, 1955  2 Sheets-Sheet 1
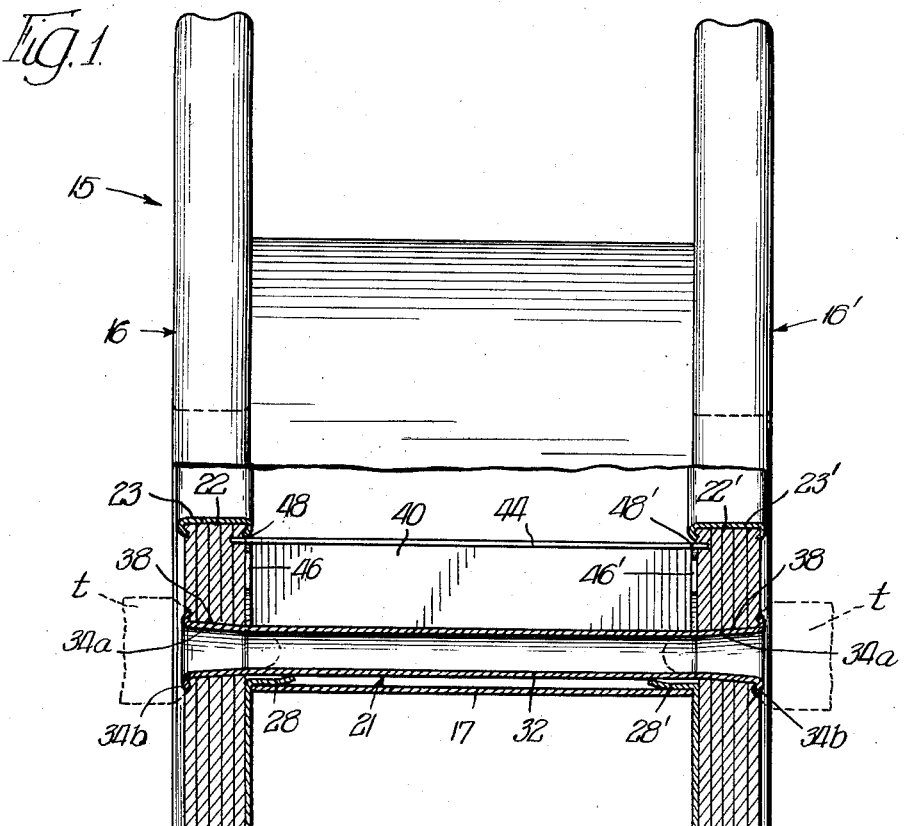
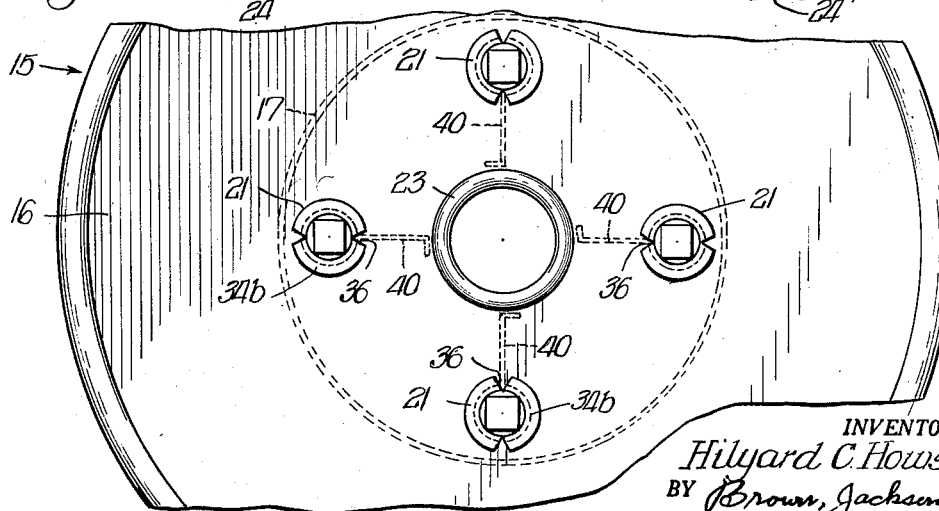
INVENTOR.
Hilyard C. Howsam,
BY Brown, Jackson,
Boettcher & Dienner
ATTYS.

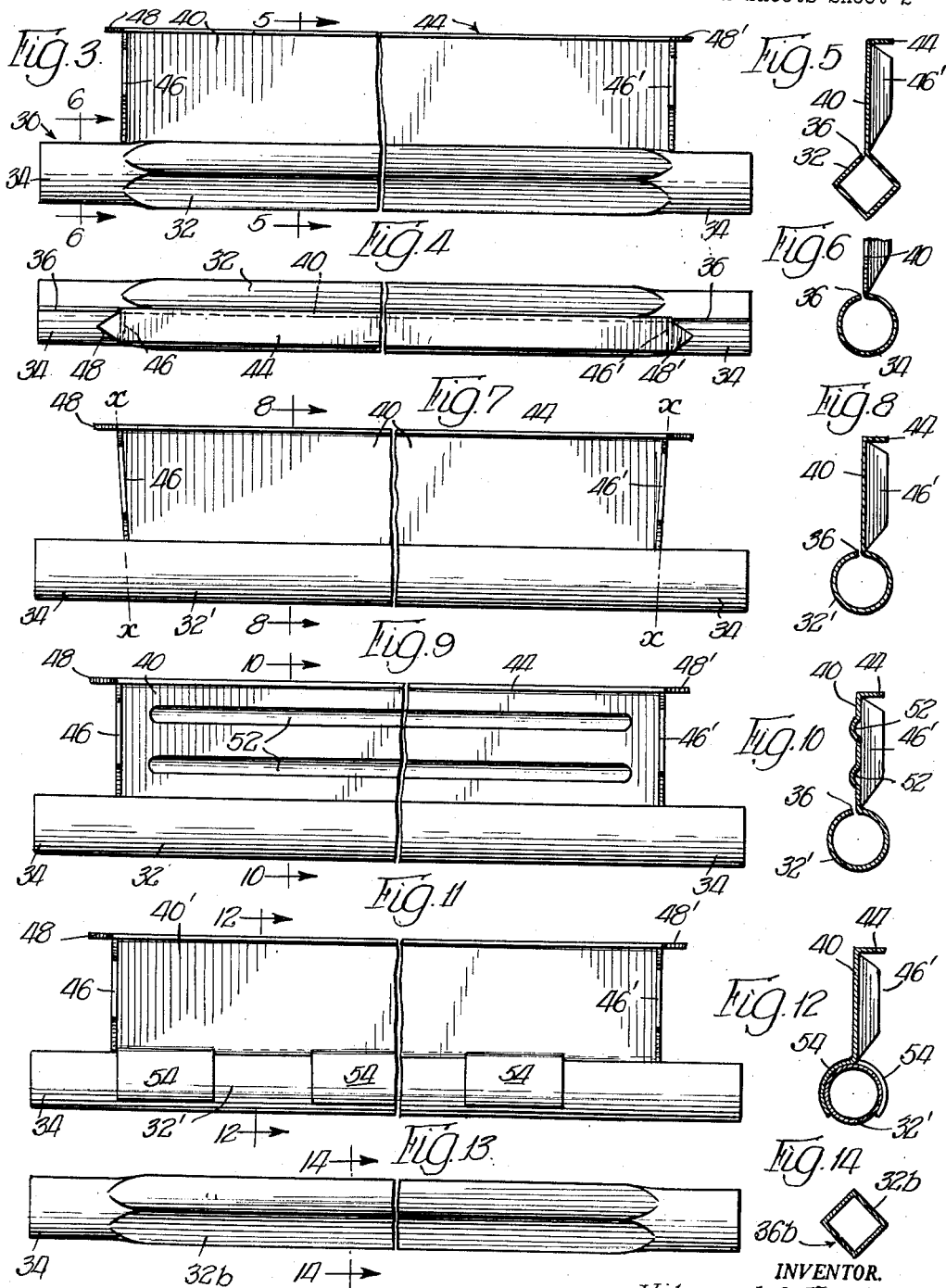

United States Patent Office 2,899,147
Patented Aug. 11, 1959

2,899,147

REEL STRUCTURE

Hilyard C. Howsam, Aurora, Ill.

Application May 31, 1955, Serial No. 511,917

11 Claims. (Cl. 242—118.6)

The present invention relates to reel structures, and more particularly to reels of the type upon which wire, cable and other stranded material is adapted to be wound.

One conventional construction of reel for this use is made up of wood end heads secured to the ends of a sheet metal drum or hub portion by transverse fastening means, passing through the end heads just inside the sheet metal hub portion. Reels of this type are subject to relatively large stresses tending to force the end heads apart, resulting from the winding of the wire or cable upon the reel under tension. Principally because of these stresses, the wood end heads are generally composed of ply wood for greater and more uniform strength.

The general object of the invention is to improve upon the transverse fastening means employed in these reels. More specifically, the improvement resides in a unique form of sheet metal tubular rivet, and in the method of mounting this rivet in the reel. These rivets pass transversely through the reel, usually just inside of the sheet metal hub portion, and have their ends flared or swaged outwardly in tapered openings in the end heads. The outward flaring of the sheet metal ends of the rivet in the tapered holes in the end heads results in a unique pressurized fit which rigidly binds the rivet against the end grain of the wood in the tapered holes, rather than against the flat grain of the wood, such resulting in a stronger joint and one which is less effected by expansion and contraction from moisture. In addition, the end extremities of the tubular rivets are spun or rolled outwardly into firm contact with the outer surfaces of the ply wood end heads.

One of the principal objects of the invention is to provide a pressurized tubular rivet which has its intermediate shank portion reinforced against lateral deflection or buckling. In the preferred embodiments of the invention, this reinforced construction is obtained by providing the intermediate shank portion of the rivet with a stiffening wing which extends parallel to and projects laterally from said shank portion. When the rivet is assembled within the reel, this stiffening wing spans the space between the end heads of the reel, and the wing is pointed or directed in an inward direction from the rivet shank toward the center of the reel. Such projecting wing stiffens the shank portion of the tubular rivet against buckling or bending; and this stiffening may be further augmented by forming a stiffening flange along the longitudinal edge of the wing, or by forming longitudinal stiffening ribs in the body of the wing, parallel to the shank of the rivet. In addition, the ends of the wing are formed with abutment flanges which abut the inner faces of the reel end heads, and the inner corners of the wing, at the ends of the longitudinal stiffening flange, are formed with spurs which effect penetrating engagement into the wood of the end heads. My invention also contemplates a toed-in relation of the abutment flanges at the ends of the stiffening wing, whereby to cause the end heads of the reel to be toed-in or dished toward each other, with their outer peripheral portions closer together than their inner central portions. This toed-in relation compensates for the spreading stresses tending to separate the end heads, which stresses are built up in the reel by the tension under which the wire or cable is wound upon the reel.

In another embodiment of the invention, the reinforced construction is obtained by forming the intermediate shank portion of the rivet of square cross-section. These tubular rivets have a butt seam with the edges of the seam preferably meeting substantially in the middle of one of the flat surfaces of the shank. By virtue of the square cross-section and the location of the butt seam, the seam will not open up, with resulting collapse of the tube, as readily as in the case of a tube of circular cross-section.

Other objects, features and advantages of the invention will be apparent from the following detail description of certain preferred embodiments thereof. In the accompanying drawings illustrating such embodiments:

Figure 1 is an edge view, partly in elevation and partly in cross-section, of a reel embodying my invention;

Figure 2 is a fragmentary side elevational view of my improved reel;

Figure 3 is a side view of one embodiment of my improved reinforced tubular rivet, showing the stiffening wing in side elevation;

Figure 4 is a view at right angles to Figure 3, showing the stiffening wing in edge elevation;

Figure 5 is a transverse sectional view, taken on the plane of the line 5—5 of Figure 3;

Figure 6 is a similar sectional view taken on the plane of the line 6—6 of Figure 3;

Figure 7 is a view similar to Figure 3 showing a modified embodiment of tubular rivet;

Figure 8 is a transverse sectional view taken on the plane of the line 8—8 of Figure 7;

Figure 9 is a view similar to Figure 3 showing another modified embodiment of tubular rivet;

Figure 10 is a transverse sectional view taken on the plane of the line 10—10 of Figure 9;

Figure 11 is a view similar to Figure 3, showing still another modified embodiment wherein the stiffening rib is made separately from the tubular rivet;

Figure 12 is a transverse sectional view taken on the plane of the line 12—12 of Figure 11;

Figure 13 is a side elevational view of another embodiment of my improved tubular rivet, characterized by an intermediate shank portion of square cross-section having a flat butt seam; and Figure 14 is a transverse sectional view taken on the plane of the line 14—14 of Figure 13.

Referring first to Figures 1 and 2, my improved reel structure is indicated generally at 15 and comprises a pair of circular, parallel, spaced-apart flat disc-like heads 16 and 16' which are preferably formed of layers of plywood, said heads being spaced apart by a tubular sheet metal hub 17. These heads are held against separation by a plurality of my improved reinforced tubular rivets, each designated 21. In the illustrated embodiment, four of these tubular rivets have been shown, located at equally spaced points just inside of the sheet metal hub 17, but it will be understood that a greater or lesser number of rivets may be employed, if desired. Each of the heads 16, 16' has a central aperture, such as apertures 22, 22' in which are seated sheet metal bearing sleeves or grommets 23, 23', which are adapted to fit over a shaft or arbor, so that the reel may be rotated thereon. The peripheries of the heads 16, 16' have centrally disposed rounded grooves 24, 24' over which are placed sheet metal covers 25, 25', respectively, which cover the peripheries and conform to their shape. As a result, the external surfaces of the covers 25, 25' provide grooves corresponding to the grooves formed in the peripheries of the head. These grooves are adapted to carry a belt which may be driven to rotate the reel when it is supported upon a shaft or arbor. To secure the covers 25, 25' in place, the outer edge of each is spun over and pressed into the outside surface of its head, thereby to grip the same, as shown at 27, 27'. At their other edges, each of the covers fits over a portion of the inner surface of each head and has an axially extending flange, such as the flange 28 of cover 25 and the flange 28' of cover 25'. The sheetmetal hub 17 has a press fit over the flanges 28, 28' and thereby holds the heads 16, 16' against relative lateral movement and against axial movement toward each other.

The sheet metal covers 25, 25' are each formed initially with a cylindrical flange which is of a diameter to receive the periphery of the head 16 or 16'. Then the metal of the flange in register with the groove in the wood is shrunk into the groove in the periphery of the head. This may be done by spinning or by a radially acting die to fit the sheet metal into the groove. Thereupon the outer edge of the flange is curled over the edge as by spinning of the metal to make the raw edge bite into the surface of the wood.

Referring now to the improved reinforced tubular rivet 21, it will be seen from the first embodiment illustrated in Figures 3–6 that each of these rivets is made up of a section of sheet metal tubing 30 which is shaped and rolled to have an intermediate shank portion 32 of polygonal cross-section, merging into cylindrical end portions 34. The polygonal shank 32 is preferably of square cross-section, as shown in Figure 5, with the bent sheet of metal coming together in a butt seam 36 at one of the corners of the square sectional outline. This square shank portion 32 is of a length to span most of the space between the end heads 16, 16'.

The cylindrical end portions 34 of the tubular rivets are inserted into tapered openings 38 in the end heads 16, 16', and are then flared or swaged outwardly into these tapered holes to form the flared portions 34a. The end extremities of the tube are also spun or rolled outwardly to form the outer beads 34b having firm contact with the wood end heads. The outward flaring of the tapered portions 34a in the tapered holes 38 in the end heads 16, 16' results in a pressurized fit which rigidly binds the tube against the end grain of the piles of wood in the tapered holes, rather than against the flat grain of the wood, resulting in a stronger joint than when binding against the flat grain of the wood.

Formed integral with the tube 30 and projecting outwardly from one lip of the butt seam 36 is the aforementioned stiffening wing, designated 40, which is of a length equal to the spacing between the two end heads 16, 16'. This wing 40 has a longitudinal reinforcing flange 44 bent over at right angles along its outer edge for stiffening the wing. The wing also has abutment flanges 46, 46' bent at right angles at its ends which are adapted to have abutment against the inner surfaces of the end heads 16, 16'. Still further, the wing is provided with small spurs 48, 48' formed as extensions of the ends of the longitudinal stiffening flange 44, these small spurs projecting just beyond the abutment flanges 46, 46'. The tubular rivets are adapted to be mounted as shown in Figure 2, with the tubular portions positioned just inside the peripheral line of the hub 17, and with the wings 40 extending inwardly therefrom towards the center of the reel structure.

In Figure 1 I have schematically illustrated in dotted outlines t the types of tools which are inserted into the opposite ends of the tubular rivets 21 in the operation of assembling the reel. Inwardly acting compression forces are set up between these tools t for producing the outwardly flared portions 34a in the tapered openings 38, and for rounding over the beaded ends 34b. In this reel assembling operation the spurs 48, 48' first penetrate the wood end heads 16, 16' and lock the wings 40 in the positions in which they have been shown in Figure 2, namely, directed inward toward the center of the reel. The inwardly acting compression forces which are set up between the tools t may be quite large, particularly when using end heads 16, 16' composed of ply wood, Masonite, or the like, in conjunction with a relatively small angle of taper 34a and a highly compressed bead 34b. These compression forces may be so large that they will buckle or bend the shank portion of a non-reinforced plain tubular rivet. However, the provision of the stiffening wing 40 positively prevents this buckling or bending of the intermediate shank portion of the rivet.

In the modified construction shown in Figures 7 and 8, the intermediate shank portion 32' is of cylindrical cross-section, the same as the cylindrical end portions 34. The stiffening wing 40 projects outwardly from one lip of the butt seam 36 the same as in the preceding embodiment. In this modified construction, I have also illustrated the abutment flanges 46, 46' as having a toed-in relation with respect to each other. As indicated in exaggerated proportions by the dotted line x—x, the end edges of the stiffening wing 40 and their abutment flanges 46, 46' converge towards each other from the spurs 48, 48' to the points of juncture of the wing with the shank portion 32. The compression forces which are set up between the tools t in assembling the reel cooperate with the toed-in formation of the stiffening wing 40 to cause the end heads 16, 16' to assume a toed-in or dished formation towards each other, with their outer peripheral portions closer together than their inner central portions. This toed-in relation compensates for the spreading stresses tending to separate the end heads, which stresses are built up in the reel by the tension under which the wire or cable is wound upon the reel. This toed-in relation may, if desired, be embodied in the construction shown in Figures 3 to 6 inclusive. Conversely, in the embodiment shown in Figures 7 and 8 the stiffening wing 40 may be provided with straight-sided ends.

In the modified construction shown in Figures 9 and 10, the reinforcing wing 40 is formed with a plurality of beads or ribs 52 extending lengthwise of the wing, these beads or ribs being punched back out of the plane of the wing 40. These beads or ribs serve to stiffen the wing and may take the place of the longitudinal reinforcing flange 44, although this flange is generally desirable whenever the small spurs 48, 48' are desirable.

In Figures 11 and 12 I have shown a modified embodiment in which the stiffening wing 40' is made separately from the shank 32'. In this embodiment, the outer edge of the wing is transversely slitted to form a series of tongues 54. Successive tongues are bent alternately to right and left, as viewed in Figure 12, and these tongues are bent on a rounded curvature to embrace more than half of the cylindrical shank portion 32. This separate stiffening wing 40 is formed with a longitudinal reinforcing flange 44, abutment flanges 46, 46' are end spurs 48, 48' the same as the previously described embodiments.

In Figures 13 an 14 I have illustrated still another embodiment of my improved tubular rivet, which does not have a stiffening wing 40 but in which a substantial degree of compression stiffening is obtained by forming the intermediate shank portion 32b of square cross-section, and by providing this square shank portion 32b with a flat butt seam 36b lying in one of the flat faces of the shank portions. This shank portion of square cross-section, with a flat butt seam meeting in the middle of one of the flat surfaces, withstands greater compression stresses than a cylindrical shank portion.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a reel structure, the combination of a hub, a pair of heads at opposite ends of said hub, angularly spaced tubular rivets joining said heads, and a stiffening wing extending longitudinally along each rivet from the inner surface of one head to the inner surface of the other head and generally radially of the hub.

2. In a reel structure, the combination of a hub, a pair of heads at opposite ends of said hub, angularly spaced tubular rivets joining said heads, a stiffening wing extending longtudinally along each rivet from the inner surface of one head to the inner surface of the other head and generally radially of the hub, and an abutment flange at each end of each wing engaging against the inner surface of the respective end head.

3. In a reel structure, the combination of a hub, a pair of heads at opposite ends of said hub, angularly spaced tubular rivets joining said heads, a stiffening wing extending longitudinally along each rivet from the inner surface of one head to the inner surface of the other head and generally radially of the rub, and a stiffening flange extending longitudinally along the free edge of each stiffening wing.

4. In a reel structure, the combination of a hub, a pair of heads at opposite ends of said hub, and angularly spaced tubular rivets joining said heads, each of said rivets including end portions which extend through said heads and are flared outwardly in tapered holes in said end heads, and a stiffening wing extending longitudinally along the intervening shank portion of each rivet from the inner surface of one head to the inner surface of the other head and generally radially of the hub.

5. In a reel structure, the combination of a hub, a pair of heads at opposite ends of said hub, and angularly spaced tubular rivets joining said heads, each of said rivets comprising flared end portions which are flared in tapered holes in said end heads, a tubular shank portion of polygonal cross-section intermediate said flared end portions, and a stiffening wing extending said shank portion.

6. In a reel structure, the combination of a pair of heads, angularly spaced tubular rivets joining said heads, stiffening wings extending from said tubular rivets between said heads, stiffening flanges extending longitudinally along the edges of said stiffening wings, and spurs projecting from the ends of said stiffening flanges for penetrating engagement into said end heads.

7. In a reel structure, the combination of a hub, a pair of heads at opposite ends of said hub, angularly spaced tubular rivets joining said heads, each of said tubular rivets comprising an intermediate shank portion lying between said heads, flared portions at the ends of said shank portion which are flared outwardly in tapered holes in said end heads, a stiffening wing extending from said shank portion, a stiffening flange extending longitudinally along the free edge of said stiffening wing, abutment flanges at the ends of said wing having abutment against said end heads, and spurs projecting from said wing having penetrating engagement into said end heads.

8. In a reel structure, the combination of a hub, a pair of heads at opposite ends of said hub, angularly spaced tubular rivets joining said heads, each of said tubular rivets comprising an intermediate shank portion lying between said heads, flared portions at the ends of said shank portion which are flared outwardly in tapered holes in said end heads, a stiffening wing extending from said shank portion, a stiffening flange extending longitudinally along the free edge of said stiffening wing, abutment flanges at the ends of said wing having abutment against said end heads, and spurs projecting from said wing having penetrating engagement into said end heads, said abutment flanges having a toed-in relation to result in a toed-in relation of said end heads.

9. In a reel structure, the combination of a hub, a pair of heads at opposite ends of said hub, and angularly spaced tubular rivets joining said heads, each of said tubular rivets comprising an intermediate shank portion of polygonal cross-section lying between said heads, flared portions at the ends of said polygonal shank portion which are flared outwardly in tapered holes in said end heads, rolled ends at the ends of said tubular rivet which are rolled outwardly over the outer surfaces of said end heads, a stiffening wing extending inwardly from said polygonal shank portion, abutment flanges at the ends of said stiffening wing for abutment against the inner surfaces of said end heads, and spurs extending from the inner corners of said stiffening wing adapted to have penetrating engagement into said end heads.

10. In a reel structure having a hub, a pair of heads at opposite ends of the hub, and angularly spaced rivets joining the end heads, the improvement comprising reinforced tubular rivets each including a rigid intermediate shank portion of polygonal cross-section which extends between the end heads of the reel and end portions of circular cross-section which extend through the said end heads and have outwardly turned ends in fixed engagement therewith.

11. In a reel structure, the combination of a hub, a pair of heads at opposite ends of said hub, and angularly spaced tubular rivets joining said end heads, each of said end heads having outwardly tapered holes therein through which said rivets extend, each of said rivets comprising a rigid intermediate shank portion of polygonal cross-section extending substantially from the inner surface of one head to the inner surface of the other head and end portions of circular cross-section extending through said tapered holes in said end heads and flared outwardly in conical form into intimate engagement in said holes.

References Cited in the file of this patent

UNITED STATES PATENTS

| | | |
|---|---|---|
| 687,562 | Hendrick | Nov. 26, 1901 |
| 962,453 | Mossberg | June 28, 1910 |
| 1,924,387 | Washburn | Aug. 29, 1933 |
| 2,058,151 | Hayward | Oct. 20, 1936 |
| 2,334,874 | Howsam | Nov. 23, 1943 |
| 2,397,362 | Markle | Mar. 26, 1946 |
| 2,487,726 | Powell | Nov. 8, 1949 |
| 2,609,162 | Howsam | Sept. 2, 1952 |

UNITED STATES PATENT OFFICE

CERTIFICATE OF CORRECTION

Patent No. 2,899,147                                                August 11, 1959

Hilyard C. Howsam

It is hereby certified that error appears in the printed specification of the above numbered patent requiring correction and that the said Letters Patent should read as corrected below.

Column 5, line 24, for "rub" read -- hub --; line 43, after "extending" insert -- from --.

Signed and sealed this 16th day of February 1960.

(SEAL)
Attest:

KARL H. AXLINE
Attesting Officer

ROBERT C. WATSON
Commissioner of Patents